United States Patent
Bishop et al.

(10) Patent No.: US 10,628,521 B2
(45) Date of Patent: *Apr. 21, 2020

(54) SCORING AUTOMATICALLY GENERATED LANGUAGE PATTERNS FOR QUESTIONS USING SYNTHETIC EVENTS

(71) Applicant: International Business Machines Corporation, Armonk, NY (US)

(72) Inventors: Timothy A. Bishop, Minneapolis, MN (US); Stephen A. Boxwell, Columbus, OH (US); Benjamin L. Brumfield, Cedar Park, TX (US); Nirav P. Desai, Austin, TX (US); Stanley J. Vernier, Columbus, OH (US)

(73) Assignee: International Business Machines Corporation, Armonk, NY (US)

( * ) Notice: Subject to any disclaimer, the term of this patent is extended or adjusted under 35 U.S.C. 154(b) by 745 days.

This patent is subject to a terminal disclaimer.

(21) Appl. No.: 14/816,200

(22) Filed: Aug. 3, 2015

(65) Prior Publication Data

US 2017/0039271 A1 Feb. 9, 2017

(51) Int. Cl.
*G06F 17/27* (2006.01)
*G06F 16/2452* (2019.01)
*G06N 5/04* (2006.01)

(52) U.S. Cl.
CPC ...... *G06F 17/271* (2013.01); *G06F 16/24522* (2019.01); *G06F 16/24526* (2019.01); *G06N 5/04* (2013.01)

(58) Field of Classification Search
None
See application file for complete search history.

(56) References Cited

U.S. PATENT DOCUMENTS 5,386,556 A * 1/1995 Hedin ................ G06F 17/271
6,028,601 A * 2/2000 Machiraju .......... G06F 16/3344
715/705

(Continued)

OTHER PUBLICATIONS

Elizabeth, et al., "Improving QA processing by semantic reformulation," 2013 International Conference on Computer Communication and Informatics (ICCCI—2013), Jan. 9-11, 2013, Coimbatore, India.*

(Continued)

*Primary Examiner* — Mariela Reyes
*Assistant Examiner* — Edward Jacobs
(74) *Attorney, Agent, or Firm* — VanLeeuwen & VanLeeuwen; William J. Stock

(57) ABSTRACT

An approach is provided in which a knowledge manager identifies training entities in a training question answer pair and identifies multiple database paths a database that link the training entities. The knowledge manager then generates multiple generalized queries based upon the identified multiple database paths and assigns query scores to the multiple generalized queries. In addition, the knowledge manager generates a generalized syntactic pattern based upon syntactic relationships between the training entities in the training question answer pair. When the knowledge manager receives a question and matches the syntactic pattern of the received question to the generalized syntactic pattern, the knowledge manager generates custom queries from the generalized queries and queries the database using the custom queries. The knowledge manager, in turn, scores answers generated from the custom queries based upon the custom queries' corresponding query scores.

15 Claims, 13 Drawing Sheets

(56) References Cited

U.S. PATENT DOCUMENTS

| | | | | |
|---|---|---|---|---|
| 6,778,951 | B1* | 8/2004 | Contractor | G06F 16/3344 704/9 |
| 7,013,264 | B2* | 3/2006 | Dolan | G06F 16/3344 704/9 |
| 7,392,229 | B2* | 6/2008 | Harris | G06F 7/02 706/12 |
| 8,005,870 | B1* | 8/2011 | Bedell | G06F 16/2428 707/802 |
| 8,543,565 | B2* | 9/2013 | Feng | G06F 16/3329 707/708 |
| 8,712,758 | B2* | 4/2014 | Crouch | G06F 17/2785 704/1 |
| 8,738,362 | B2* | 5/2014 | Ferrucci | G06F 16/3329 704/9 |
| 8,738,617 | B2* | 5/2014 | Brown | F16H 1/28 707/731 |
| 8,935,277 | B2* | 1/2015 | Kuchmann-Beauger | G06F 16/24535 707/769 |
| 8,977,953 | B1* | 3/2015 | Pierre | G06F 17/2785 715/230 |
| 9,183,511 | B2* | 11/2015 | Li | G06N 5/02 |
| 9,213,771 | B2* | 12/2015 | Chen | G06F 16/3329 |
| 9,336,269 | B1* | 5/2016 | Smith | G06F 16/245 |
| 9,390,087 | B1* | 7/2016 | Roux | G06F 17/2881 |
| 9,659,005 | B2* | 5/2017 | Ramish | G06F 17/2785 |
| 9,672,251 | B1* | 6/2017 | Whang | G06F 16/24575 |
| 9,721,001 | B2* | 8/2017 | Chewning | G06F 16/3329 |
| 2004/0030556 | A1* | 2/2004 | Bennett | G06F 17/27 704/270 |
| 2004/0078190 | A1* | 4/2004 | Fass | G06F 17/241 704/7 |
| 2007/0094285 | A1* | 4/2007 | Agichtein | G06F 16/243 |
| 2008/0059153 | A1* | 3/2008 | Bennett | G06F 17/27 704/9 |
| 2008/0319932 | A1* | 12/2008 | Yih | G06K 9/6256 706/20 |
| 2009/0012971 | A1* | 1/2009 | Hunt | G06Q 30/02 |
| 2009/0070311 | A1* | 3/2009 | Feng | G06F 16/3329 |
| 2009/0292687 | A1* | 11/2009 | Fan | G06N 5/02 |
| 2010/0063797 | A1* | 3/2010 | Cong | G06F 16/367 704/9 |
| 2011/0307435 | A1* | 12/2011 | Overell | G06F 17/278 706/46 |
| 2012/0078826 | A1* | 3/2012 | Ferrucci | G06N 7/005 706/12 |
| 2012/0078890 | A1* | 3/2012 | Fan | G09B 7/00 707/723 |
| 2012/0078891 | A1* | 3/2012 | Brown | F16H 1/28 707/723 |
| 2012/0265528 | A1* | 10/2012 | Gruber | G10L 15/18 704/235 |
| 2012/0265531 | A1* | 10/2012 | Bennett | G06F 17/27 704/254 |
| 2012/0323906 | A1* | 12/2012 | Fan | G09B 7/00 707/723 |
| 2012/0330921 | A1* | 12/2012 | Ferrucci | G06F 16/3329 707/706 |
| 2013/0007033 | A1* | 1/2013 | Brown | G06F 17/28 707/764 |
| 2013/0117022 | A1* | 5/2013 | Chen | G06F 3/167 704/235 |
| 2013/0226846 | A1* | 8/2013 | Li | G06N 5/02 706/12 |
| 2013/0262080 | A1* | 10/2013 | Marciano | G06F 17/2836 704/3 |
| 2013/0262501 | A1* | 10/2013 | Kuchmann-Beauger | G06F 16/24535 707/769 |
| 2014/0089280 | A1* | 3/2014 | Palay | H04L 51/16 707/696 |
| 2014/0136188 | A1* | 5/2014 | Wroczynski | G06F 17/2872 704/9 |
| 2014/0351281 | A1* | 11/2014 | Tunstall-Pedoe | G06N 5/02 707/760 |
| 2014/0358890 | A1* | 12/2014 | Chen | G06F 16/3329 707/710 |
| 2015/0066484 | A1* | 3/2015 | Nathan | G06F 17/279 704/9 |
| 2015/0227268 | A1* | 8/2015 | Rathod | G06Q 10/00 715/739 |
| 2015/0269175 | A1* | 9/2015 | Espenshade | G06F 16/90324 706/47 |
| 2015/0331850 | A1* | 11/2015 | Ramish | G06F 17/2785 704/9 |
| 2016/0098441 | A1* | 4/2016 | Waltinger | G06N 5/027 707/756 |
| 2016/0275073 | A1* | 9/2016 | Poon | G06F 17/271 |
| 2016/0299884 | A1* | 10/2016 | Chioasca | G06F 17/2705 |
| 2016/0357854 | A1* | 12/2016 | Hashimoto | G06Q 50/01 |

OTHER PUBLICATIONS

Giordani et al., "Semantic Mapping between Natural Language Questions and SQL Queries via Syntactic Pairing," 14th International Conference on Applications of Natural Language to Information Systems, NLDB 2009, Germany, Jun. 24-26, 2009, pp. 207-221, Springer Berlin Heidelberg.

Cabrio et al., :QAKiS: an Open Domain QA System based on Relational Patterns, The 11th International Semantic Web Conference (ISWC 2012), Nov. 2012, Boston, Massachusetts, 4 pages.

Bishop et al., "Mapping Questions to Complex Database Lookups using Synthetic Events," U.S. Appl. No. 14/816,186, filed Aug. 3, 2015, 49 pages.

* cited by examiner

1300

| QUERY ANSWERS | SCORE |
|---|---|
| Training Query A Answers:<br>Canada | Query Score: .6 |
| Training Query B Answers:<br>Canada, Mexico | Query Score: 1.0 |
| Training Query C Answers:<br>Canada, Mexico, France, England, 5 years | Query Score: .3 |

*FIG. 13*

SCORING AUTOMATICALLY GENERATED LANGUAGE PATTERNS FOR QUESTIONS USING SYNTHETIC EVENTS

BACKGROUND

System developers typically train question answer systems by ingesting corpora from trusted, traditional sources (textbooks, journals) that include accurate information. At times, a system developer may train a question answer system to a specific domain to increase the question answer system's accuracy (e.g., financial domain, travel domain, etc.). Once the question answer system is trained, the question answer system receives questions and performs queries on the trained domain. Processing resources required to convert natural language questions into formal database questions depends, in part, upon the correlation between terms in the question and terms used in the formal database. Simple patterns like "Who is the X of Y" are easily converted into a formal query when the structure of a relational database is simple.

However, more complex questions may not correspond closely to the underlying database structure, such as "Who was elected in 2000 as the United States President?" In these situations, a question answer system requires a substantial amount of resources to generate formal database queries for complex questions, which typically includes a trained linguist manually enumerating hard-coded database lookups.

BRIEF SUMMARY

According to one embodiment of the present disclosure, an approach is provided in which a knowledge manager identifies training entities in a training question answer pair and identifies multiple database paths a database that link the training entities. The knowledge manager then generates multiple generalized queries based upon the identified multiple database paths and assigns query scores to the multiple generalized queries. In addition, the knowledge manager generates a generalized syntactic pattern based upon syntactic relationships between the training entities in the training question answer pair. When the knowledge manager receives a question and matches the syntactic pattern of the received question to the generalized syntactic pattern, the knowledge manager generates custom queries from the generalized queries and queries the database using the custom queries. The knowledge manager, in turn, scores answers generated from the custom queries based upon the custom queries' corresponding query scores.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 13 is an exemplary diagram depicting scores assigned to training queries based upon their corresponding training results.

DETAILED DESCRIPTION

Figure 1:
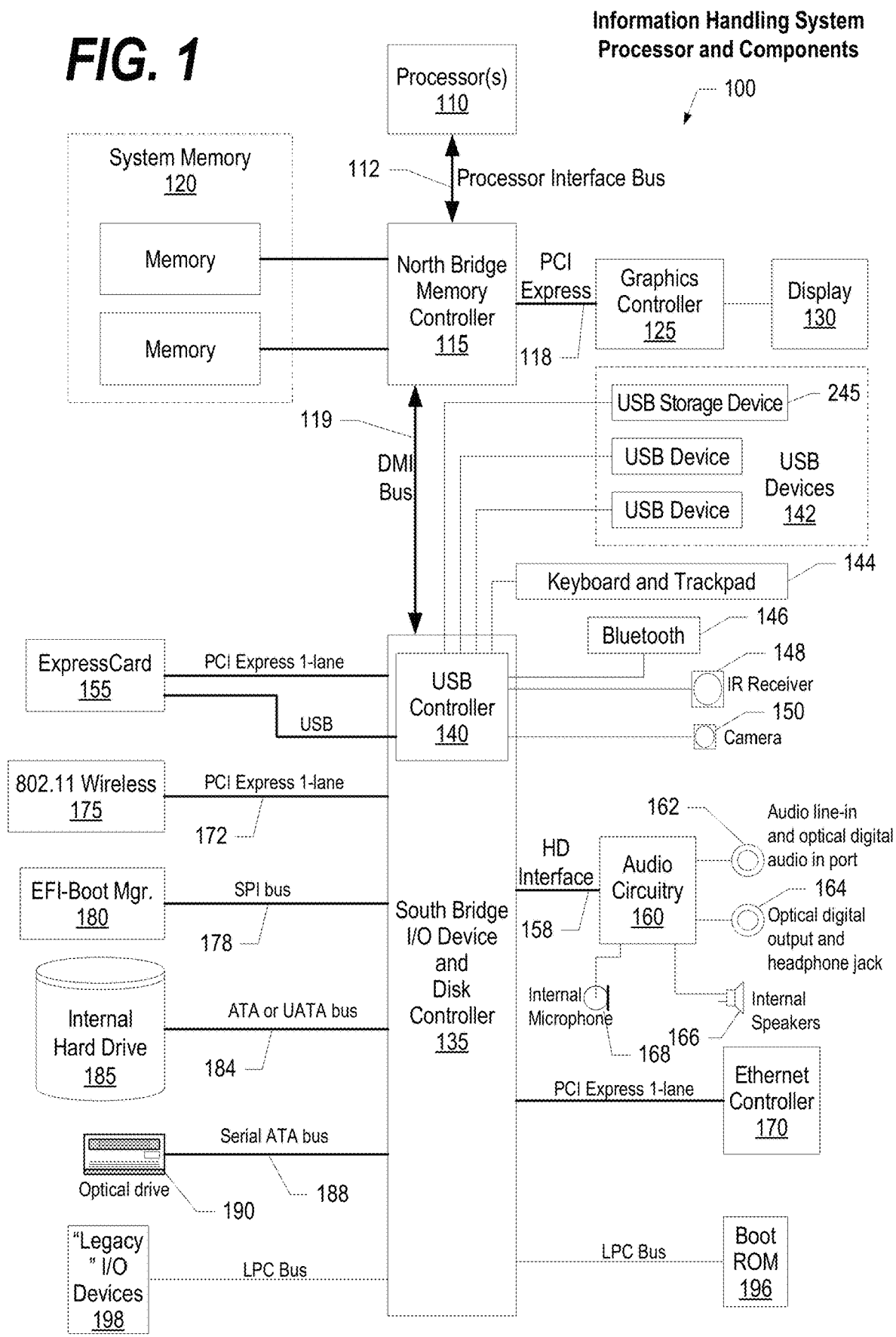
FIG. 1 depicts a schematic diagram of one illustrative embodiment of a knowledge manager system in a computer network.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 depicts a schematic diagram of one illustrative embodiment of a question/answer creation (QA) system 100 in a computer network 102. Knowledge manager 100 may include a computing device 104 (comprising one or more processors and one or more memories, and potentially any other computing device elements generally known in the art including buses, storage devices, communication interfaces, and the like) connected to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. Knowledge manager 100 and network 102 may enable question/answer (QA) generation functionality for one or more content users. Other embodiments of knowledge manager 100 may be used with components, systems, sub-systems, and/or devices other than those that are depicted herein.

Knowledge manager 100 may be configured to receive inputs from various sources. For example, knowledge manager 100 may receive input from the network 102, a corpus of electronic documents 106 or other data, a content creator 108, content users, and other possible sources of input. In one embodiment, some or all of the inputs to knowledge manager 100 may be routed through the network 102. The various computing devices 104 on the network 102 may include access points for content creators and content users. Some of the computing devices 104 may include devices for a database storing the corpus of data. The network 102 may include local network connections and remote connections in various embodiments, such that knowledge manager 100 may operate in environments of any size, including local and global, e.g., the Internet. Additionally, knowledge manager 100 serves as a front-end system that can make available a variety of knowledge extracted from or represented in documents, network-accessible sources and/or structured resource sources. In this manner, some processes populate the knowledge manager with the knowledge manager also including input interfaces to receive knowledge requests and respond accordingly.

In one embodiment, the content creator creates content in a document 106 for use as part of a corpus of data with knowledge manager 100. The document 106 may include any file, text, article, or source of data for use in knowledge manager 100. Content users may access knowledge manager 100 via a network connection or an Internet connection to the network 102, and may input questions to knowledge manager 100 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions (e.g., natural language questions, etc.) to the knowledge manager. Knowledge manager 100 may interpret the question and provide a response to the content user containing one or more answers to the question. In some embodiments, knowledge manager 100 may provide a response to users in a ranked list of answers.

In some illustrative embodiments, knowledge manager 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information handling systems that can utilize knowledge manager 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 100. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
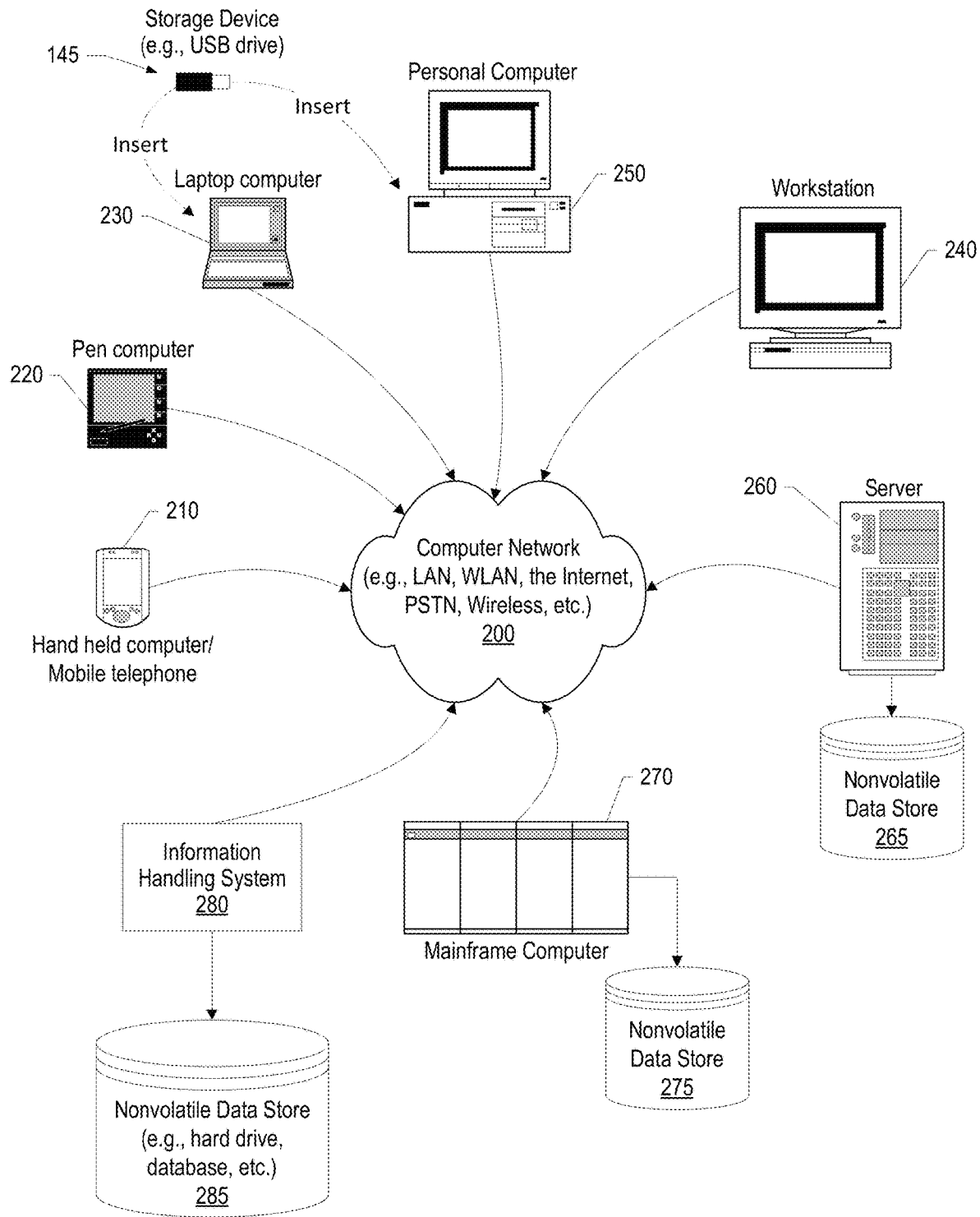
FIG. 2 illustrates an information handling system, more particularly, a processor and common components, which is a simplified example of a computer system capable of performing the computing operations described herein.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE 0.802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

FIGS. 3-9 depict an approach that can be executed on an information handling system. A knowledge manager obtains a set of training question answer pairs and/or training sentences from a subject matter expert or unstructured corpus. The knowledge manager generates a training syntactic pattern based upon a training question answer pair, which that identifies a syntactic relationship between various entities within the training question answer pair. In addition, the knowledge manager creates training queries based upon paths within a database that link the various training entities. The knowledge manager creates a generalized syntactic pattern and generalized queries from the training syntactic pattern and the training queries, respectively, by replacing the training entities with generalized variables.

In turn, when the knowledge manager receives a question, the knowledge manager generates a syntactic pattern of the question and compares the question's syntactic pattern to the generalized syntactic pattern. When the two match, the knowledge manager generates a custom query from the corresponding generalized queries and queries the database using the custom queries. The custom queries return candidate answers, which the knowledge manager scores and provides to a user. As a result, the knowledge manager easily creates custom queries to query the database instead of using a large amount of processing resources to create specific queries from the question.

In one embodiment, the knowledge manager scores the training queries during the training stage based upon the type of answers the training query returns relative to training answers. The query scores are then propagated through to the custom queries and used in the candidate answer scoring and ranking.

Figure 3:
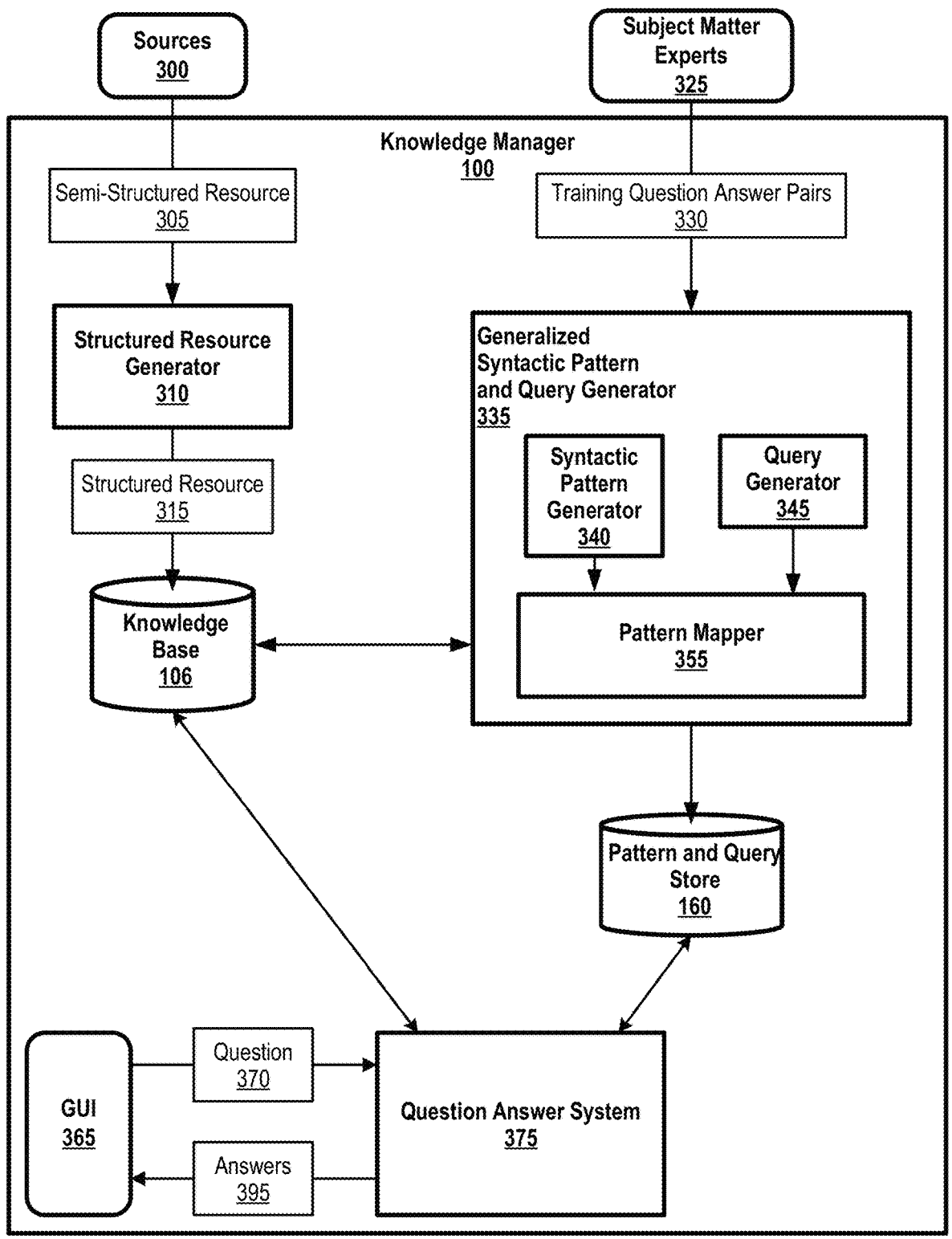
FIG. 3 is an exemplary diagram depicting a knowledge manager that creates generalized queries and transforms the generalized queries into custom queries based on a received question.

FIG. 3 is an exemplary diagram depicting a knowledge manager that creates generalized queries and transforms the generalized queries into custom queries based on a received question.

Knowledge manager 100, in one embodiment, receives semi-structured resource 305 from sources 300. Semi-structured resource 305 may be, for example, an outline, a tree structure, a spreadsheet, an HTML-formatted table, a CSV (comma-separated values) formatted file, a TSV (tab-separated values) formatted file, a wiki-markup table, an ordered list, an unordered list, or other forms of data that include loosely organized items.

Because semi-structured resource 305 does not provide a clear view on its organization, queries against the resource may not be accurate. To alleviate this issue, knowledge manager 100 uses structured resource generator 310 to transform semi-structured resource 305 into structured resource 315. Structured resource generator 310 identifies parent/child relationships between semi-structured items and creates synthetic events accordingly (see FIG. 4 and corresponding text for further details). In turn, structured resource generator 310 uses the synthetic events to generate structured resource 315. For example, semi-structured resource 305 may be an outline, which structured resource generator 310 generates into a triples database and stores as structured resource 315.

Structured resource generator 310 stores structured resource 315 in knowledge base 106, which question answer system 340 utilizes during question answer sessions. In addition, generalized syntactic pattern and query generator 335 accesses structured resource 315 to identify paths within the structured resource and generate training queries as will be discussed below.

Knowledge manager 100 receives training question answer pairs 330 from subject matter experts 325. In one embodiment, training question answer pairs 330 includes training questions and training answers. In another embodiment, training question answer pairs 330 includes training sentences that encompass training questions and answers.

Generalized syntactic pattern and query generator 335 generates a generalized query and a generalized syntactic pattern based upon training question answer pairs 330 using syntactic pattern generator 340, query generator 345, and pattern mapper 355. Syntactic pattern generator identifies training entities (terms) in the training question answer pairs and creates a training syntactic pattern, while query generator 345 accesses knowledge base 106 to identify database paths between the training entities to generate training queries (see FIG. 5 and corresponding text for further details).

In one embodiment, generalized syntactic pattern and query generator 335 includes a training query scorer. The training query scorer queries knowledge base 106 using the training queries and matches the returned answers with the training answers. The training query scorer then assigns a score to the training queries based upon the accuracy of their corresponding candidate answers to create scored training queries (see FIG. 11 and corresponding text for further details).

Pattern mapper 355 replaces the training entities in the training syntactic pattern and training query that match with generalized variables to generate a generalized syntactic pattern and generalized queries. Pattern mapper 355 stores the generalized syntactic pattern and generalized queries in pattern and query store 160 for use by question answer system 370 discussed below. In one embodiment, pattern mapper 355 propagates scores from scored training queries to the generalized queries to create scored generalized queries.

Question answer system 375 receives question 370 from GUI 365 and generates a syntactic pattern based upon the question. Question answer system 375 compares the question's syntactic pattern with generalized syntactic patterns stored in pattern and query store 160. When question answer system 375 finds a match, question answer system 375 modifies the generalized queries corresponding to the matched generalized syntactic pattern to create custom queries.

Question answer system 375 then queries knowledge base 106 with the custom queries to generate candidate answers. Question answer system 375 scores and ranks the candidate answers to create answers 395, which question answer system 375 sends to GUI 365. In one embodiment that includes scored generalized queries, question answer system 375 applies the scores from the scored generalized queries to their corresponding candidate answers during the scoring process.

Figure 4:
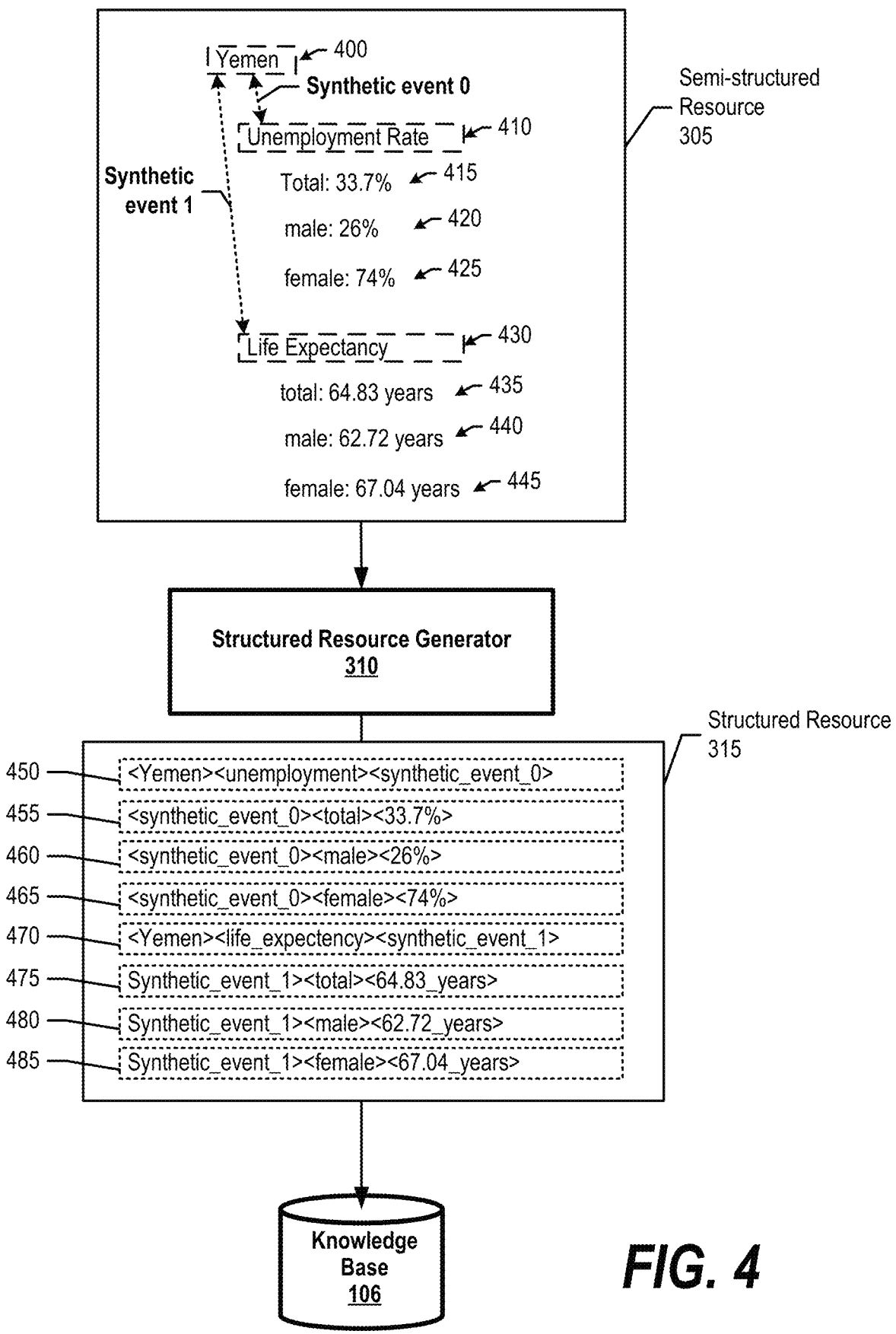
FIG. 4 is an exemplary diagram depicting semi-structured resource feeding into a structured resource generator that generates a structured resource using synthetic events.

FIG. 4 is an exemplary diagram depicting semi-structured resource feeding into a structured resource generator that generates a structured resource using synthetic events. The example shown in FIG. 4 shows semi-structured resource 305 as an outline. In this example, semi-structured resource has two parent/child hierarchies, which are item 400 being a parent to entity 410 and 430.

Structured resource generator 310 identifies the parent/child hierarchies and creates synthetic_event_0 to represent the relationship between entity 400 and entity 410, and creates synthetic_event_1 to represent the relationship between entity 400 and entity 430. As such, structured resource generator 310 creates triples entries 450-485 and stores them as structured resource 315.

Entry 450 includes synthetic_event_0, which links entity 400 to entity 410. Entry 455 links entity 415 to items 410 and 400 through synthetic_event_0. Entry 460 links entry 420 to entity 410 and 400 through synthetic_event_0. And, entry 465 links entity 425 to entity 410 and 400 through synthetic_event_0.

Entry 470 includes synthetic_event_1, which links entity 400 to entity 430. Entry 475 links entity 435 to entity 430 and 400 through synthetic_event_1. Entry 480 links entity 440 to entity 430 and 400 through synthetic_event_1. And, entry 485 links entity 445 to entity 430 and 400 through synthetic_event_1.

Structured resource 315 is now in a form for knowledge manager 100 to identify database paths between certain entities, such as entity 400 and entity 440. Knowledge manager 100 uses the identified database paths during the training phase to create training queries such as training query 530 shown in FIG. 5.

Figure 5:
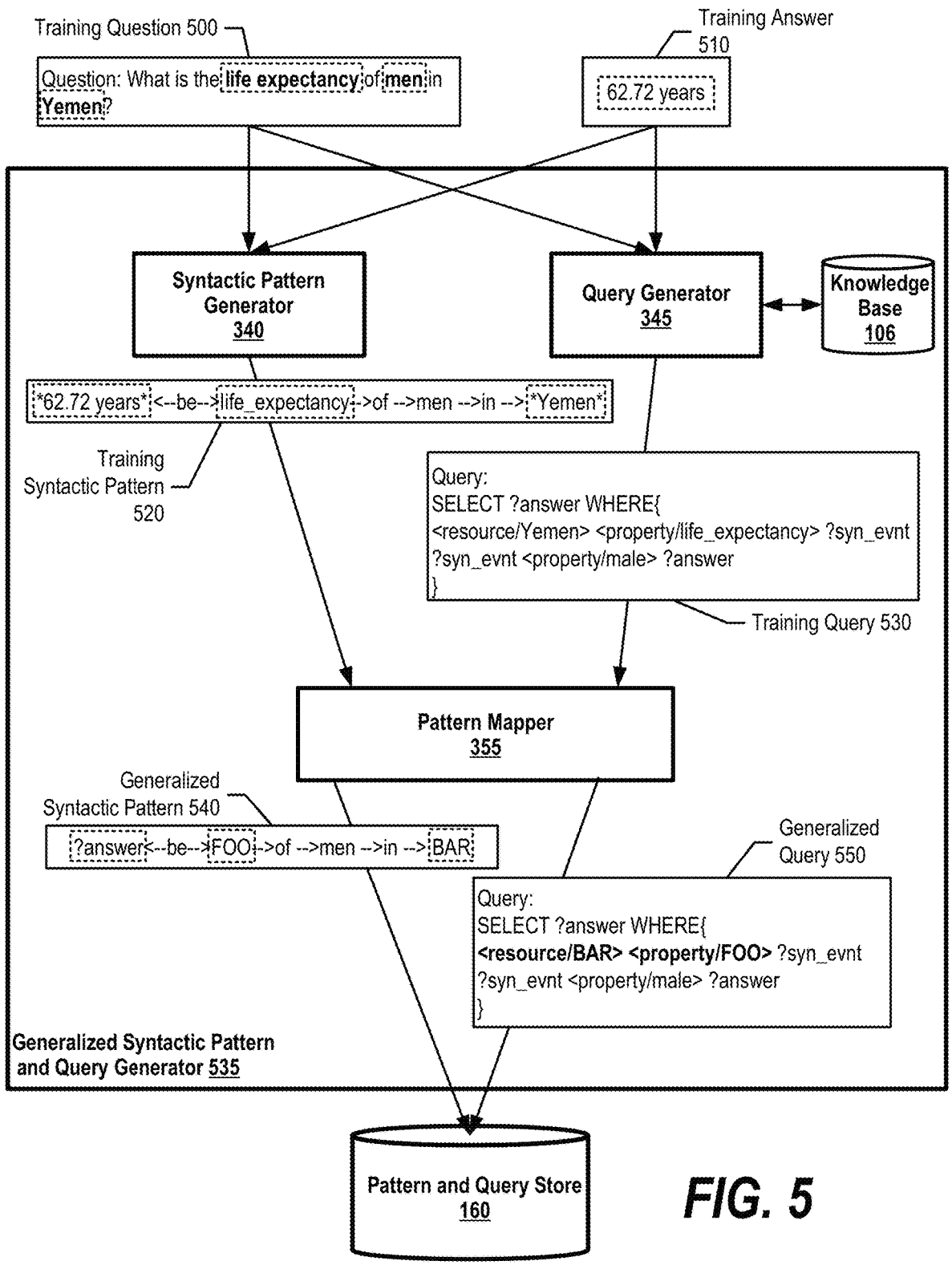
FIG. 5 is an exemplary diagram showing a process flow by a knowledge manager to create generalized syntactic patterns and generalized queries from a training question answer pair.

FIG. 5 is an exemplary diagram showing a process flow by knowledge manager 100 to create generalized syntactic patterns and generalized queries from a training question answer pair.

The knowledge manager receives a training question answer pair, which includes training question 500 and training answer 510. Training question 500 includes three question training entities (in dashed boxes), and training answer 510 includes one training answer entity.

Syntactic pattern generator 340, in one embodiment, generates a focus phrase from training question 500 and training answer 510 and, in turn, generates training syntactic pattern 520 based upon the syntactic relationships between the training entities within the focus phrase.

Query generator 345 identifies database paths in knowledge base 106 (structured resource 315) that link the training question entities to the training answer entities. For example, query generator 345 finds a database path between life expectancy and 62.72 years, then finds a database path between men and 62.72 years, and then finds a database path between Yemen and 62.72 years in structured resource 315. In turn, query generator 345 generates training query 530. In one embodiment, query generator 345 generates multiple training queries, such as one for each identified database path (see FIG. 8 and corresponding text for further details).

Pattern mapper 355 identifies matching entities in training syntactic pattern 520 and training query 530, and replaces the matching entities with generalized variables. FIG. 5 shows that life expectancy is replaced with FOO and Yemen is replaced with BAR. Pattern mapper 355 creates generalized syntactic pattern 540 and generalized query 550 using the generalized variables and stores them in pattern and query store 160.

Subsequently, knowledge manager 100 matches generalized syntactic pattern 540 to a received question's syntactic pattern and creates a custom query from generalized query 550 by replacing the generalized variables in generalized query 550 with question entities included in the question (See FIG. 6 and corresponding text for further details).

Figure 6:
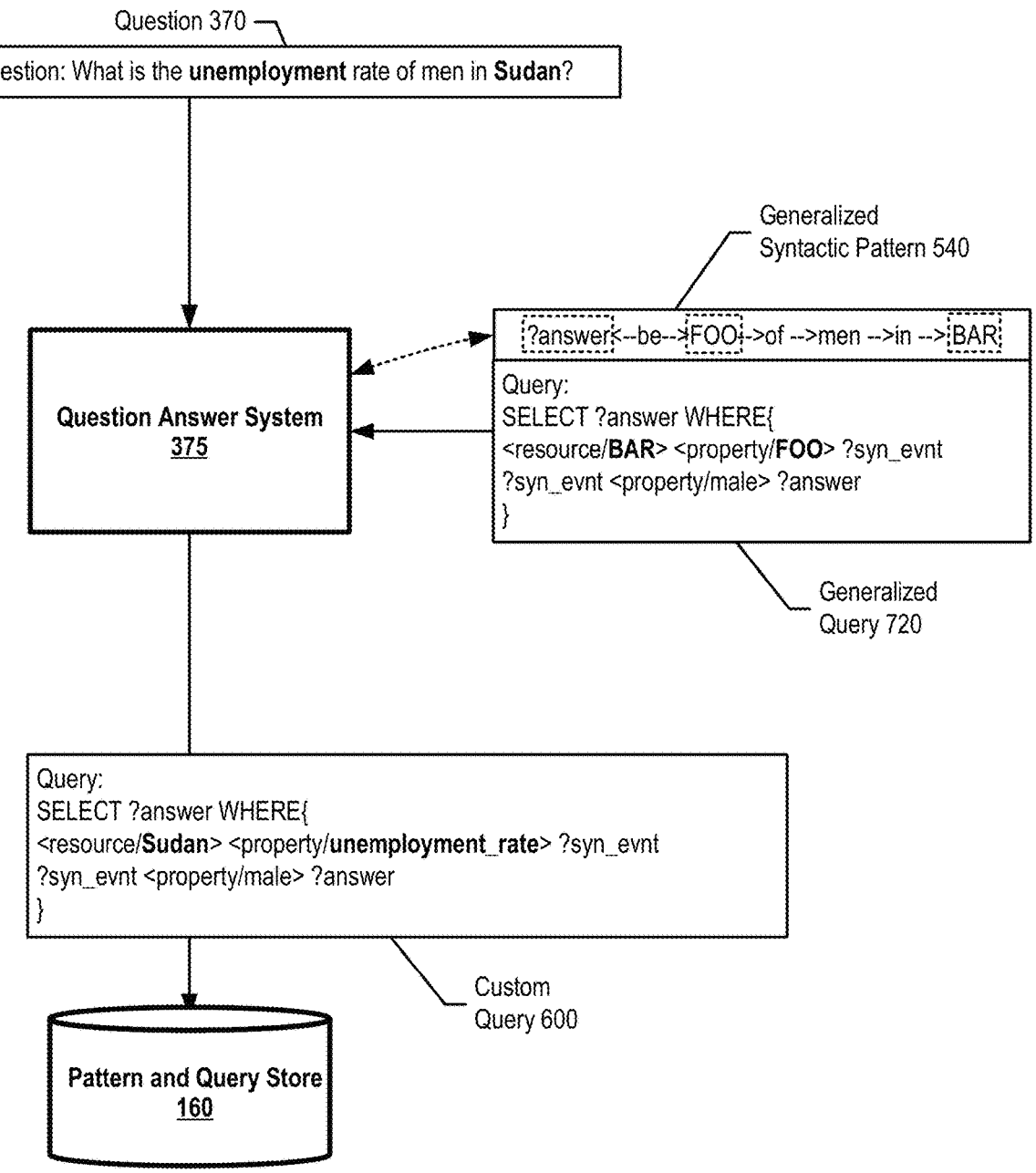
FIG. 6 is an exemplary diagram showing a process flow by a knowledge manager to create a custom query from a generalized query based upon a received question.

FIG. 6 is an exemplary diagram showing a process flow by knowledge manager 100 to create a custom query, from a generalized query, based upon a received question. Question answer system 375 receives question 370 and generates a syntactic pattern for the question, which maps syntactic relationships between terms included in question 370. Question answer system 375 compares the question's syntactic pattern against generalized syntactic patterns in pattern and query store, and identifies a match with generalized syntactic pattern 540.

Question answer system 375, in turn, identifies entities in the question's syntactic pattern that map to the generalized variables FOO and BAR in generalized syntactic pattern 540. Question answer system 375 then replaces the FOO and BAR in generalized query 720 with the identified question entities to generate custom query 600. Question answer system 375 then uses custom query 600 to query knowledge manager 106 (see FIG. 10 and corresponding text for further details).

Figure 7:
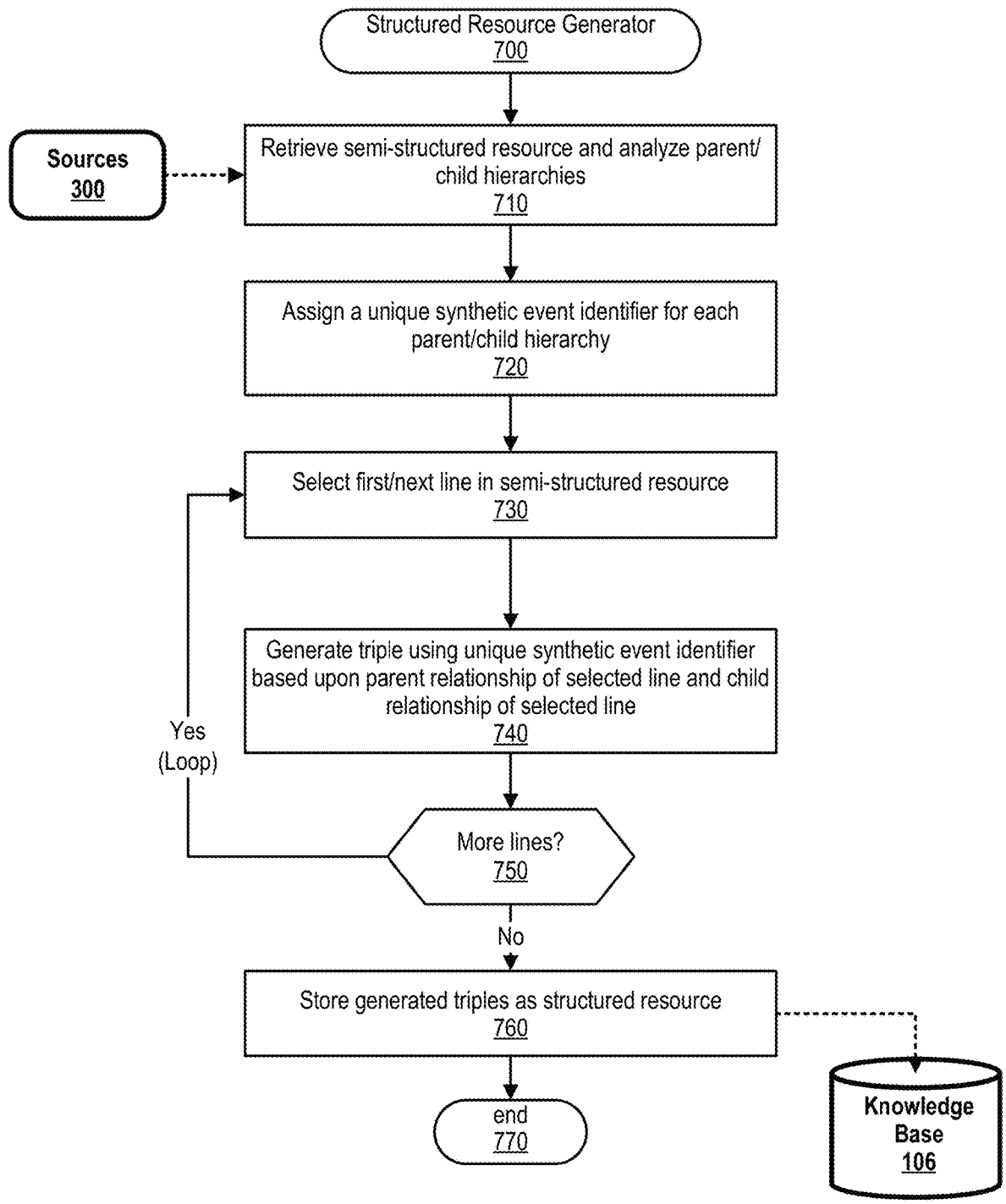
FIG. 7 is an exemplary flowchart depicting steps taken by a knowledge manager to create a structured resource from a semi-structured resource.

FIG. 7 is an exemplary flowchart depicting steps taken by a knowledge manager to create a structured resource from a semi-structured resource. FIG. 7 processing commences at 700 whereupon, at step 710, the process retrieves semi-structured resources from source 300 and analyzes parent/child hierarchies in the semi-structured resource. For example, referring to FIG. 4, processing identifies a parent/child hierarchy between entity 400 and entity 410.

At step 720, the process assigns a unique synthetic event identifier for each parent/child hierarchy (e.g., synthetic event 0 in FIG. 4). At step 730, the process selects the first line in semi-structured resource and, at step 740, the process generates a triple using the unique synthetic event identifier based upon the parent relationship of selected line and child relationship of the selected line.

The process determines as to whether there are more lines in the semi-structured resource for which to evaluate (decision 750). If there are more lines to evaluate, then decision 750 branches to the 'yes' branch, which loops back to select and process the next line in the semi-structured resource. On the other hand, if there are no more lines to evaluate, then decision 750 branches to the 'no' branch. At step 760, the process stores the generated triples as a structured resource in knowledge base 106, and FIG. 7 processing thereafter ends at 770.

Figure 8:
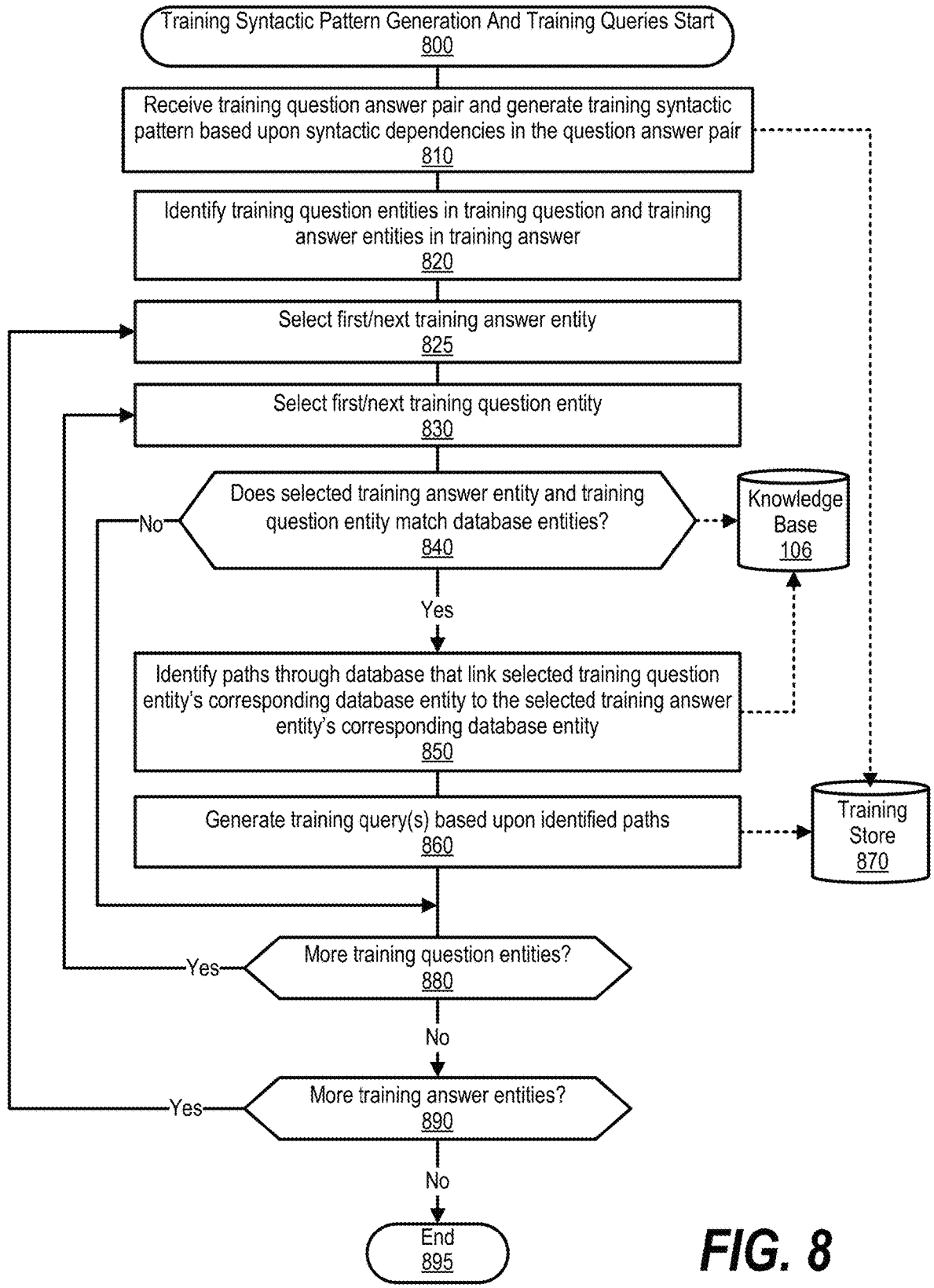
FIG. 8 is an exemplary flowchart depicting steps taken by a knowledge manager to generate training syntactic patterns and training queries based upon a training question answer pair.

FIG. 8 is an exemplary flowchart depicting steps taken by a knowledge manager to generate training syntactic patterns and training queries based upon a training question answer pair. FIG. 8 processing commences at 800 whereupon, at step 810, the process receives a training question answer pair and generates a training syntactic pattern based upon syntactic dependencies in the question answer pair (see reference numeral 520 in FIG. 5).

At step 820, the process identifies training question entities in the training question, and also identifies training answer entities in the training answer. At step 825, the process selects the first training answer entity and, at step 830, the process selects the first training question entity.

The process determines as to whether the selected training answer entity and the training question entity match database entities in knowledge manager 106 (decision 840). If the selected training answer entity and training question entity match one of the database entities, then decision 840 branches to the 'yes' branch.

At step 850, the process identifies paths through the database that link the selected training question entity's corresponding database entity to the selected training answer entity's corresponding database entity. For example, referring to FIG. 5, the process determines whether a database path exists between Yemen and 62.72 years. At step 860, the process generates training query(s) based upon the identified paths, such as training query 530 shown in FIG. 5.

The process determines as to whether there are more training question entities to evaluate (decision 880). If there are more training question entities, then decision 880 branches to the 'yes' branch which loops back to select and evaluate the next training question entity against the selected training answer entity. This looping continues until there are no more training question entities to evaluate against the selected training answer entity, at which point decision 880 branches to the 'no' branch exiting the loop.

The process determines as to whether there are more training answer entities to evaluate (decision 890). If there are more training answer entities to evaluate, then decision 890 branches to the 'yes' branch which loops back to select and evaluate the next training answer entity against the training question entities. This looping continues until there are no more training answer entities to evaluate, at which point decision 880 branches to the 'no' branch exiting the loop. FIG. 8 processing thereafter ends at 895.

Figure 9:
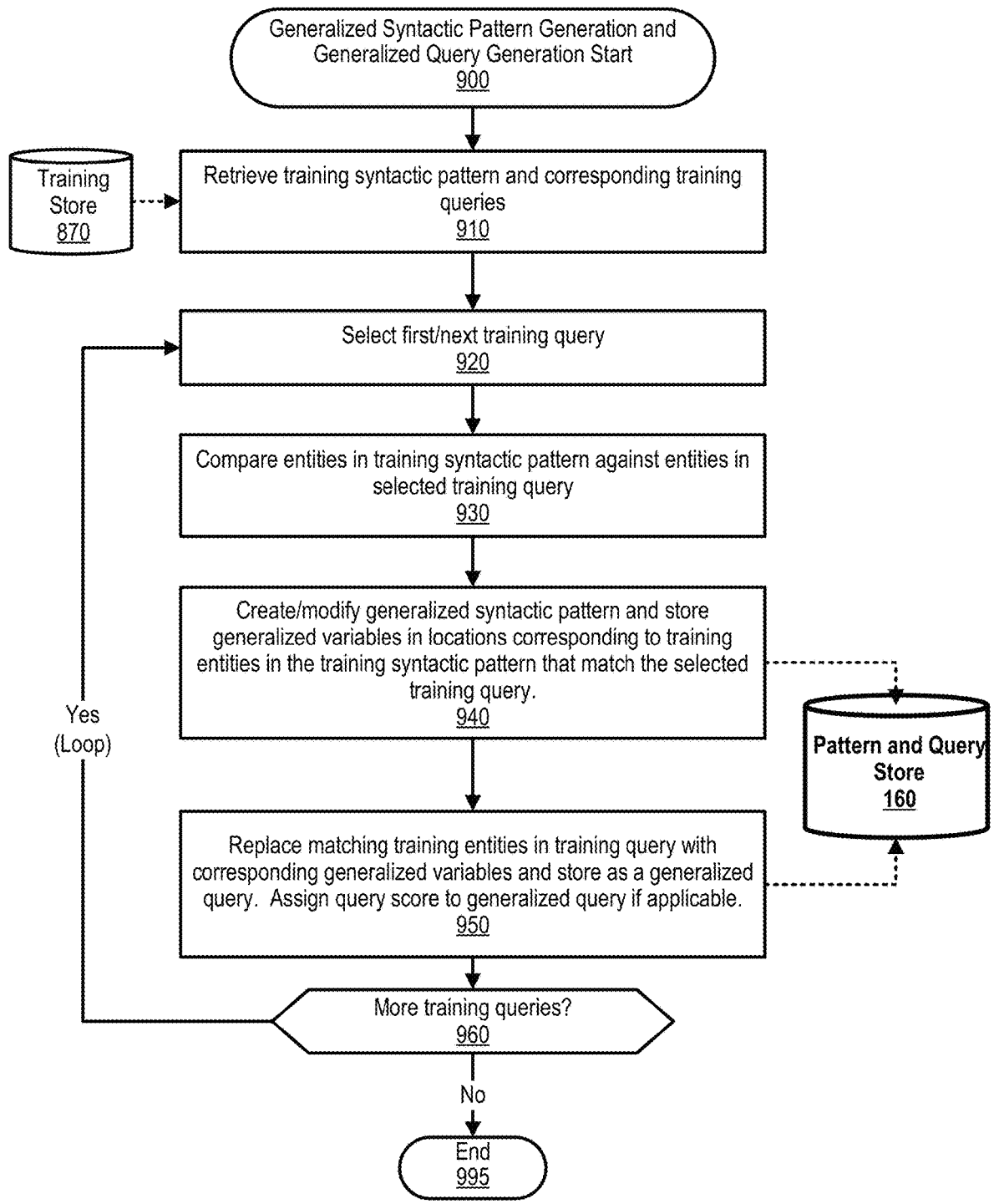
FIG. 9 is an exemplary flowchart depicting steps taken by a knowledge manager to create generalized syntactic patterns and generalized queries.

FIG. 9 is an exemplary flowchart depicting steps taken by a knowledge manager to create generalized syntactic patterns and generalized queries. FIG. 9 processing commences at 900 whereupon, at step 910, the process retrieves a training syntactic pattern and corresponding training queries. In one embodiment, the training syntactic pattern corresponds to multiple training syntactic patterns. For example, assuming that the process discovered three database paths that link training entities, the process may generate three separate training queries for a single syntactic pattern that corresponds to a training question answer pair.

At step 920, the process selects the first training query. At step 930, the process compares entities in the training syntactic pattern against entities in the selected training query. At step 940, the process creates a generalized syntactic pattern and stores generalized variables in locations corresponding to training entities in the training syntactic pattern that match the selected training query. When the process loops through FIG. 9 a second pass to process a second training query, the process searches for other entities that have not yet been matched to the training syntactic pattern and replaces those variables accordingly.

At step 950, the process replaces matching training entities in the training query with corresponding generalized variables and stores the modified training query as a generalized query in pattern and query store 160. In one embodiment, the process assigns a query score, previously given to the training query (see FIG. 12 and corresponding text for further details), to the generalized query.

The process determines as to whether there are more training queries to evaluate (decision 960). If there are more training queries to evaluate, then decision 960 branches to the 'yes' branch which loops back to select and process the next training query. This looping continues until each of the training queries corresponding to the training syntactic pattern have been processed, at which point decision 960 branches to the 'no' branch exiting the loop. FIG. 9 processing thereafter ends at 995.

Figure 10:
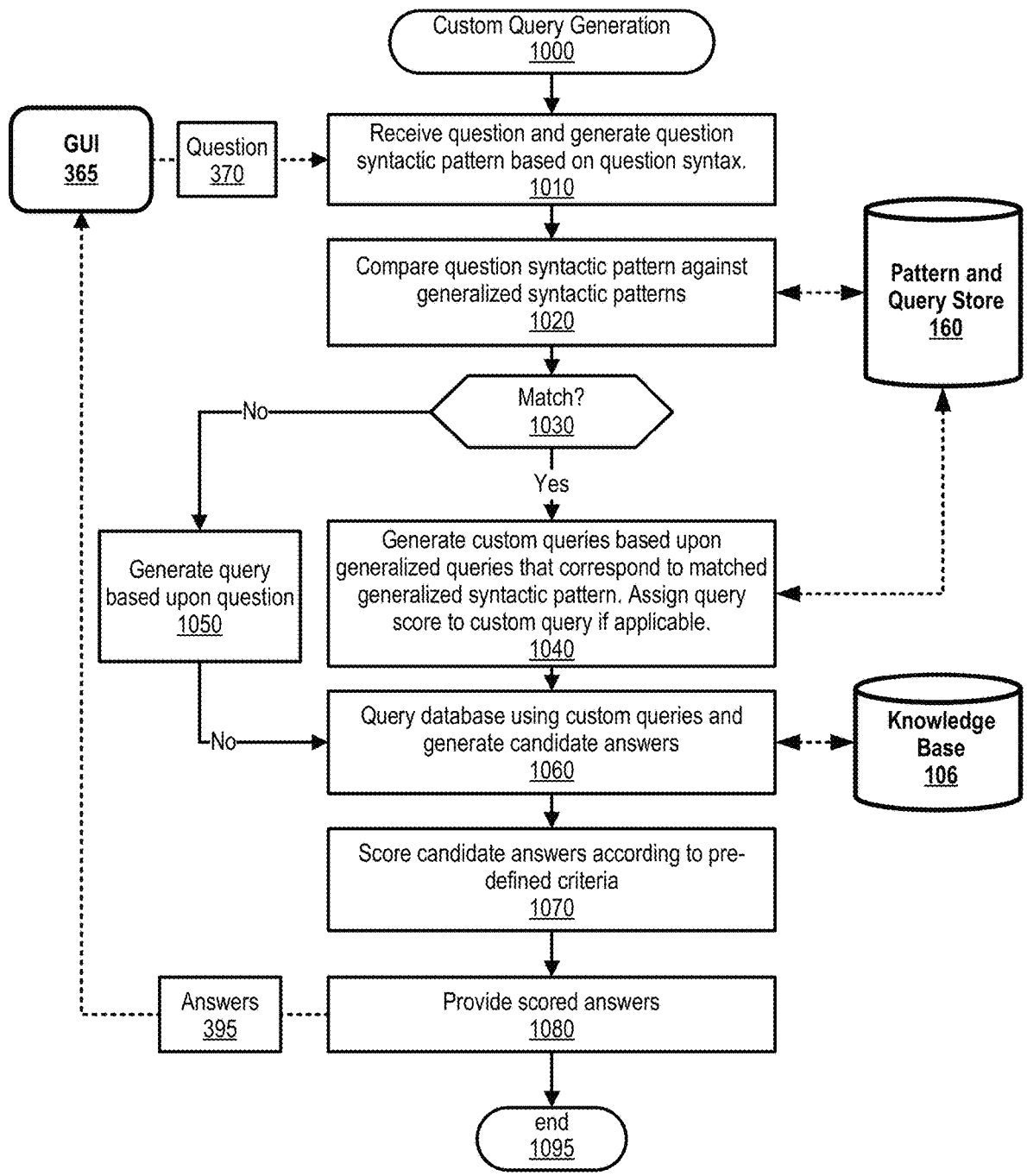
FIG. 10 is an exemplary flowchart depicting steps taken by a knowledge manager to generate custom queries from generalized queries and query a database using the question queries.

FIG. 10 is an exemplary flowchart depicting steps taken by a knowledge manager to generate custom queries from generalized queries and query a database using the question queries. FIG. 10 processing commences at 1000 whereupon, at step 1010, the process receives a question and generates a question's syntactic pattern based on the question syntax.

At step 1020, the process compares the question's syntactic pattern against generalized syntactic patterns in pattern and query store 160. The process determines as to whether the comparison results in a match (decision 1030). If a match does not occur, then decision 1030 branches to the "No" branch, whereupon the process generates a query based upon the received question (step 1050). On the other hand, if a match occurs, then decision 1030 branches to the 'yes' branch, whereupon, at step 1040, the process generates custom queries based upon generalized queries that correspond to the matched generalized syntactic pattern (see FIG. 6 and corresponding text for further details). In one embodiment, the process assigns a query score previously given to the generalized query (see FIG. 9, step 950) to the custom query.

At step 1060, the process queries the database using the custom queries and generates candidate answers. At step 1070, the process scores and ranks candidate answers according to pre-defined criteria. In one embodiment, the process uses the scores assigned to their corresponding custom query during the scoring and ranking steps. At step 1080, the process provides the scored answers (answers 395) to the user via GUI 365, and FIG. 10 processing thereafter ends at 1095.

Figure 11:
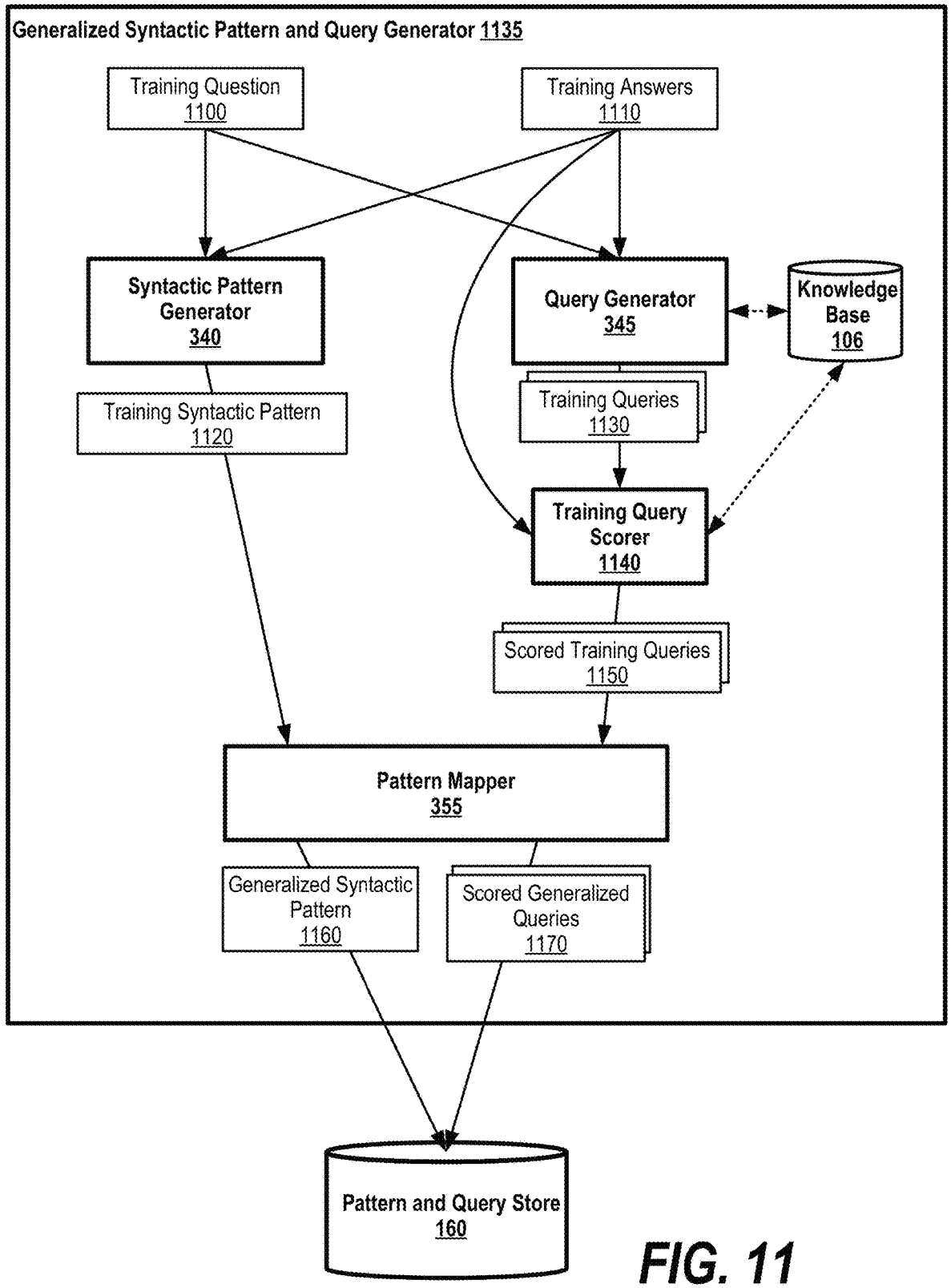
FIG. 11 is an exemplary diagram showing a process flow by a knowledge manager to create generalized syntactic patterns and scored generalized queries based upon scoring their corresponding training queries during the training process.

FIG. 11 is an exemplary diagram showing a process flow by knowledge manager 100 to create generalized syntactic patterns and scored generalized queries based upon scoring their corresponding training queries during the training process. In one embodiment, knowledge manager 100 scores the training queries during the training stage based upon the type of answers the training query returns relative to training answers. The query scores are then propagated through to the custom queries and used in the candidate answer scoring and ranking stage. Functional blocks included in FIG. 11 are similar to those shown in FIG. 5 with the exception of training query scorer 1140.

Syntactic pattern generator 340 receives training question 110 and training answers 1110 and generates a focus phrase accordingly. Syntactic pattern generator 340, in turn, generates training syntactic pattern 1120 based upon the syntactic relationships between the training entities within the focus phrase as discussed earlier.

Query generator 345 identifies database paths in knowledge base 106 (structured resource 315) that link the training question entities to the training answer entities and generates training queries 1130 based on the identified database paths as discussed earlier.

Training query scorer 1140 queries knowledge base 106 using training queries 1130 and compares their returned answers with training answers 1110. For example, if training question is "What countries boarder the United States," training answers 110 includes Canada and Mexico. In this example, if a selected one of training queries 1130 generated only Canada, the selected training query would not be scored as high as a training query that returned both Canada and Mexico (see FIGS. 12-13 and corresponding text for further details).

Training query scorer 1140 assigns scores to training queries 1130 and sends scored training queries 1150 to pattern mapper 355 for analysis as discussed in FIG. 5. Pattern mapper 355 performs similar steps as discussed earlier to generate generalized syntactic pattern 1160 and scored generalized queries 1170 but scored generalized queries 1170 includes the scores of their corresponding scored training queries. Generalized syntactic pattern 1160 and scored generalized queries 1170 are stored in pattern and query store for subsequent use by question answer system 375.

Figure 12:
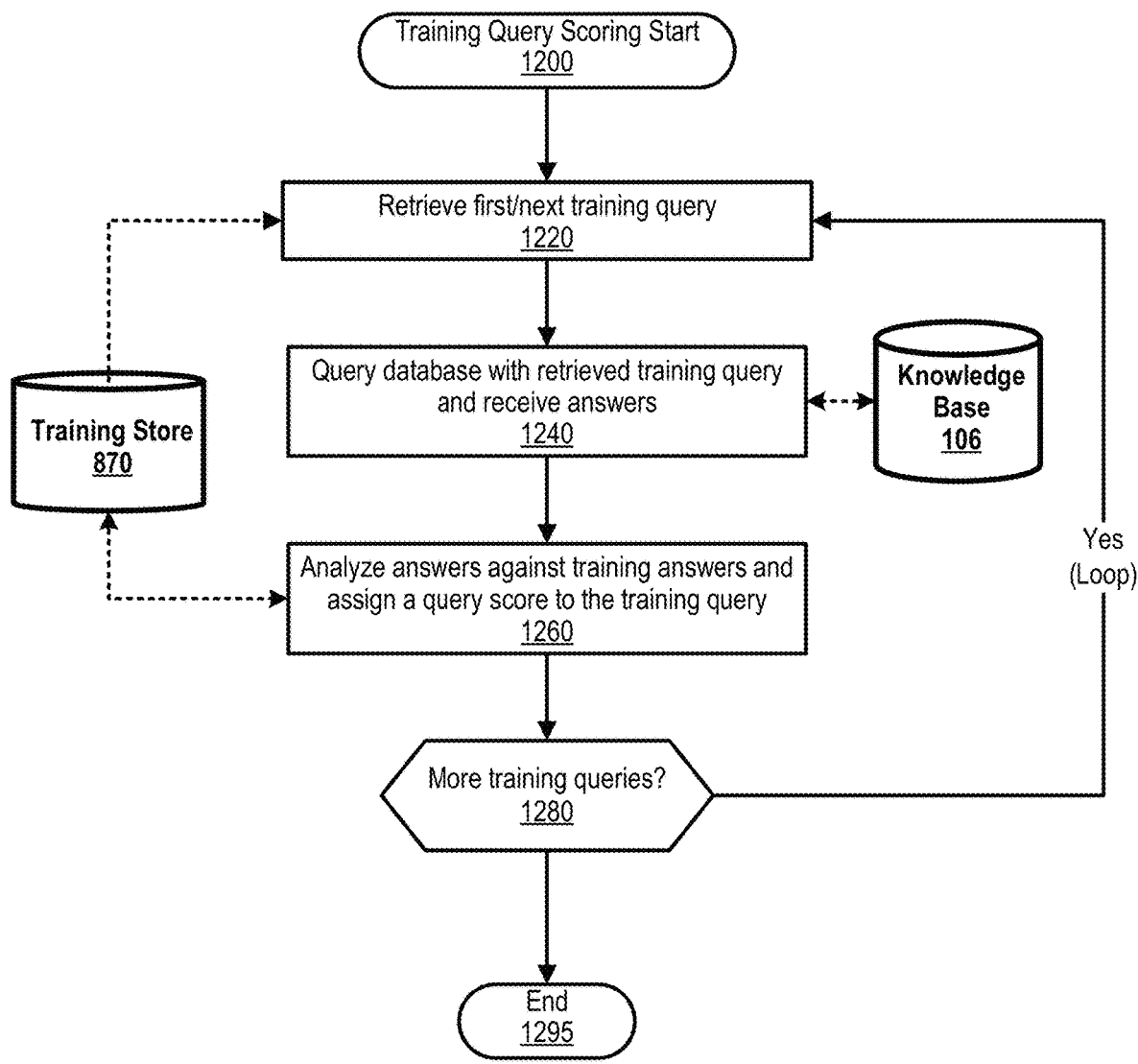
FIG. 12 is an exemplary flowchart depicting steps taken by a knowledge manager to score training questions based upon comparing their candidate answers against training answers.

FIG. 12 is an exemplary flowchart depicting steps taken by a knowledge manager to score training questions based upon comparing their candidate answers against training answers, such as steps taken by training query scorer 1140 shown in FIG. 11. FIG. 12 processing commences at 1200 whereupon, at step 1220, the process retrieves the first training query from training store 870. Training query generation steps were discussed earlier and shown in FIG. 8.

At step 1240, the process queries the database in knowledge base 106 with the retrieved training query and receives candidate answers. At step 1260, the process analyzes the candidate answers against training answers and assigns a score to the training query. For example, the training query may return Canada but the training answers include both Canada and Mexico.

The process determines as to whether there are more training queries to score (decision 1280). If there are more training queries to score, decision 1280 branches to the 'yes' branch which loops back to select and score the next training query. This looping continues until there are no more training queries to score, at which point decision 1280 branches to the 'no' branch exiting the loop. FIG. 12 processing thereafter ends at 1295.

FIG. 13 is an exemplary diagram depicting answers returned and scores assigned to their corresponding training queries. As shown in FIGS. 11 and 12, the knowledge manager may evaluate the accuracy of newly generated training queries by querying a database and comparing their results against training answers.

Table 1300 is an exemplary representation of a way in which the knowledge manager tracks the training query results and assigns their score. For example, assuming that the question was "What countries boarder the United States?," the correct answers are Canada and Mexico. Table 1300 shows that training query A produced one correct answer of Canada and was scored at 0.6. Training query B produced both answers of Canada and Mexico and, in turn, was scored at 1.0. Training query C produced both correct answers, but also returned other incorrect answers. As such, training query C was scored at 0.3.

Knowledge manager 100 propagates the training query scores to the generalized queries that are generated from training queries A, B, and C (see step 950 in FIG. 9). When the generalized queries are transformed to custom queries, the scores are also propagated to the custom queries. For example, since training query A has a score of 0.6, generalized query A will also have a score of 0.6 as will custom query A (see step 1040 in FIG. 10). As such, custom query A's query results will be scored using, in part, the 0.6 scoring factor (see step 1070 in FIG. 10).

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
   creating a structured database from a semi-structured database, wherein the structured database comprises a plurality of triples that each comprises one of a plurality of hierarchy identifiers that are based on a plurality of parent/child relationships found in the semi-structured database:
   training a question answer system, the training further comprising:
      receiving a training question answer pair that comprises a plurality of first training entities and at least one second training entity;
      generating a training syntactic pattern that comprises the plurality of first training entities and the at least one second training entity;
      in response to evaluating the training question answer pair against the structured database, generating a training query comprising the plurality of first training entities, the second training entity, and one of the plurality of hierarchy identifiers that links a first one of the plurality of triples to a second one of the plurality of triples, wherein the first triple comprises at least one of the plurality of first training entities and wherein the second triple comprises the second training entity;
      replacing, in the training syntactic pattern, the plurality of first training entities with a plurality of first generalized variables and the at least one second training entity with at least one second generalized variable, resulting in a generalized syntactic pattern; and
      creating a plurality of generalized queries based on the plurality of first training entities, the at least one second training entity, and at least one of the plurality of hierarchy identifiers, wherein each of the plurality of generalized queries is assigned one of a plurality of query scores;
   in response to training the question answer system, the method further comprises:
      matching a syntactic pattern of a question to the generalized syntactic pattern, wherein the question comprises a plurality of first question entities and at least one second question entity; and
      in response to matching the syntactic pattern of the question to the generalized syntactic pattern:
         constructing a plurality of custom queries from the plurality of generalized queries by replacing, in each of the plurality of generalized queries, the plurality of first generalized variables with the plurality of first question entities and the at least one second generalized variable with the at least one second question entity, wherein each of the plurality of custom queries is different and is assigned the query score of its corresponding generalized query; and
         generating a plurality of answers to the question in response to querying the structured database using the plurality of custom queries, wherein each of the plurality of answers is scored based upon the assigned query score of its corresponding custom query.

2. The method of claim 1 wherein the creating of the plurality of generalized queries further comprises:
   querying the structured database using the training query, resulting in one or more training results;
   computing a selected one of the plurality query scores based upon comparing the one or more training results to one or more training answers included in the training question answer pair;
   assigning the selected query score to the training query; and
   assigning the selected query score to a selected one of the plurality of generalized queries.

3. The method of claim 2 further comprising:
   in response to determining that both the training query and the training syntactic pattern include the plurality of first training entities and the at least one second training entity, generating the generalized syntactic pattern.

4. The method of claim 3 further comprising:
   determining that the training syntactic pattern includes a third training entity that is included in a different training query; and
   modifying the training syntactic pattern by replacing the third training entity in the training syntactic pattern with a third generalized variable.

5. The method of 4 further comprising:
replacing the third training entity in the different training query with the third generalized variable, resulting in a different one of the plurality of generalized queries.

6. An information handling system comprising:
one or more processors;
a memory coupled to at least one of the processors; and
a set of computer program instructions stored in the memory and executed by at least one of the processors in order to perform actions of:
creating a structured database from a semi-structured database, wherein the structured database comprises a plurality of triples that each comprises one of a plurality of hierarchy identifiers that are based on a plurality of parent/child relationships found in the semi-structured database:
training a question answer system, the training further comprising:
receiving a training question answer pair that comprises a plurality of first training entities and at least one second training entity;
generating a training syntactic pattern that comprises the plurality of first training entities and the at least one second training entity;
in response to evaluating the training question answer pair against the structured database, generating a training query comprising the plurality of first training entities, the second training entity, and one of the plurality of hierarchy identifiers that links a first one of the plurality of triples to a second one of the plurality of triples, wherein the first triple comprises at least one of the plurality of first training entities and wherein the second triple comprises the second training entity;
replacing, in the training syntactic pattern, the plurality of first training entities with a plurality of first generalized variables and the at least one second training entity with at least one second generalized variable, resulting in a generalized syntactic pattern; and
creating a plurality of generalized queries based on the plurality of first training entities, the at least one second training entity, and at least one of the plurality of hierarchy identifiers, wherein each of the plurality of generalized queries is assigned one of a plurality of query scores;
in response to training the question answer system, the method further comprises:
matching a syntactic pattern of a question to the generalized syntactic pattern, wherein the question comprises a plurality of first question entities and at least one second question entity; and
in response to matching the syntactic pattern of the question to the generalized syntactic pattern:
constructing a plurality of custom queries from the plurality of generalized queries by replacing, in each of the plurality of generalized queries, the plurality of first generalized variables with the plurality of first question entities and the at least one second generalized variable with the at least one second question entity, wherein each of the plurality of custom queries is different and is assigned the query score of its corresponding generalized query; and
generating a plurality of answers to the question in response to querying the structured database using the plurality of custom queries, wherein each of the plurality of answers is scored based upon the assigned query score of its corresponding custom query.

7. The information handling system of claim 6 wherein at least one of the one or more processors perform additional actions comprising:
querying the structured database using the training query, resulting in one or more training results;
computing a selected one of the plurality query scores based upon comparing the one or more training results to one or more training answers included in the training question answer pair;
assigning the selected query score to the training query; and
assigning the selected query score to a selected one of the plurality of generalized queries.

8. The information handling system of claim 7 wherein at least one of the one or more processors perform additional actions comprising:
in response to determining that both the training query and the training syntactic pattern include the plurality of first training entities and the at least one second training entity, generating the generalized syntactic pattern.

9. The information handling system of claim 8 wherein at least one of the one or more processors perform additional actions comprising:
determining that the training syntactic pattern includes a third training entity that is included in a different training query; and
modifying the training syntactic pattern by replacing the third training entity in the training syntactic pattern with a third generalized variable.

10. The information handling system of claim 9 wherein at least one of the one or more processors perform additional actions comprising:
replacing the third training entity in the different training query with the third generalized variable, resulting in a different one of the plurality of generalized queries.

11. A computer program product stored in a computer readable storage medium, comprising computer program code that, when executed by an information handling system, causes the information handling system to perform actions comprising:
creating a structured database from a semi-structured database, wherein the structured database comprises a plurality of triples that each comprises one of a plurality of hierarchy identifiers that are based on a plurality of parent/child relationships found in the semi-structured database:
training a question answer system, the training further comprising:
receiving a training question answer pair that comprises a plurality of first training entities and at least one second training entity;
generating a training syntactic pattern that comprises the plurality of first training entities and the at least one second training entity;
in response to evaluating the training question answer pair against the structured database, generating a training query comprising the plurality of first training entities, the second training entity, and one of the plurality of hierarchy identifiers that links a first one of the plurality of triples to a second one of the plurality of triples, wherein the first triple comprises at least one of the plurality of first training entities and wherein the second triple comprises the second training entity;

replacing, in the training syntactic pattern, the plurality of first training entities with a plurality of first generalized variables and the at least one second training entity with at least one second generalized variable, resulting in a generalized syntactic pattern; and creating a plurality of generalized queries based on the plurality of first training entities, the at least one second training entity, and at least one of the plurality of hierarchy identifiers, wherein each of the plurality of generalized queries is assigned one of a plurality of query scores;

in response to training the question answer system, the method further comprises:

matching a syntactic pattern of a question to the generalized syntactic pattern, wherein the question comprises a plurality of first question entities and at least one second question entity; and in response to matching the syntactic pattern of the question to the generalized syntactic pattern:

constructing a plurality of custom queries from the plurality of generalized queries by replacing, in each of the plurality of generalized queries, the plurality of first generalized variables with the plurality of first question entities and the at least one second generalized variable with the at least one second question entity, wherein each of the plurality of custom queries is different and is assigned the query score of its corresponding generalized query; and generating a plurality of answers to the question in response to querying the structured database using the plurality of custom queries, wherein each of the plurality of answers is scored based upon the assigned query score of its corresponding custom query.

12. The computer program product of claim 11 wherein the information handling system performs additional actions comprising:

querying the structured database using the training query, resulting in one or more training results;

computing a selected one of the plurality query scores based upon comparing the one or more training results to one or more training answers included in the training question answer pair;

assigning the selected query score to the training query; and assigning the selected query score to a selected one of the plurality of generalized queries.

13. The computer program product of claim 12 wherein the information handling system performs additional actions comprising:

in response to determining that both the training query and the training syntactic pattern include the plurality of first training entities and the at least one second training entity, generating the generalized syntactic pattern.

14. The computer program product of claim 13 wherein the information handling system performs additional actions comprising:

determining that the training syntactic pattern includes a third training entity that is included in a different training query; and modifying the training syntactic pattern by replacing the third training entity in the training syntactic pattern with a third generalized variable.

15. The computer program product of claim 13 wherein the information handling system performs additional actions comprising:

replacing the third training entity in the different training query with the third generalized variable, resulting in a different one of the plurality of generalized queries.

* * * * *